(12) United States Patent  (10) Patent No.: US 8,286,873 B2
Ryu et al.  (45) Date of Patent: Oct. 16, 2012

(54) COMBI CARD AND COMMUNICATION SYSTEM USING THEREOF

(75) Inventors: Jin Ho Ryu, Daejeon (KR); Jong Hoon Chae, Daejeon (KR); Ho Sang Lee, Daejeon (KR); Ho Geun Song, Daejeon (KR); Jin Ki Hong, Daejeon (KR); Hyun Mi Kim, Daejeon (KR)

(73) Assignee: Korea Mining, Security Printing & ID Card Operating Corp., Daejeon (KR)

( * ) Notice: Subject to any disclaimer, the term of this patent is extended or adjusted under 35 U.S.C. 154(b) by 140 days.

(21) Appl. No.: 12/818,370

(22) Filed: Jun. 18, 2010

(65) Prior Publication Data

US 2010/0320270 A1   Dec. 23, 2010

(30) Foreign Application Priority Data

Jun. 19, 2009  (KR) ........................ 10-2009-0055060

(51) Int. Cl.
*G06K 7/00* (2006.01)
(52) U.S. Cl. ......... 235/435; 235/380; 235/492; 235/451
(58) Field of Classification Search .................. 235/435, 235/380, 492, 451, 487
See application file for complete search history.

(56) References Cited

U.S. PATENT DOCUMENTS

| | | | |
|---|---|---|---|
| 6,378,774 B1 | 4/2002 | Emori et al. | |
| 6,601,770 B1 | 8/2003 | Ikefuji et al. | |
| 7,044,388 B2 * | 5/2006 | Kamiya et al. | 235/492 |
| 2004/0232248 A1 * | 11/2004 | Cho | 235/492 |
| 2008/0035741 A1 * | 2/2008 | Sakama | 235/492 |
| 2008/0277484 A1 * | 11/2008 | Launay et al. | 235/492 |
| 2008/0308641 A1 * | 12/2008 | Finn | 235/492 |

FOREIGN PATENT DOCUMENTS

| | | |
|---|---|---|
| DE | 3721822 C1 | 11/1988 |
| EP | 1701296 A1 | 9/2006 |
| JP | 10320519 A | 12/1998 |
| JP | 200124548 A | 1/2001 |
| JP | 2002203224 A | 7/2002 |
| JP | 2003-218624 | 7/2003 |
| JP | 2005332015 A | 12/2005 |
| KR | 10-2002-0036577 | 5/2002 |
| KR | 10-2002-0062198 | 7/2002 |
| KR | 10-2004-0049981 | 6/2004 |
| KR | 10-2008-0098360 | 11/2008 |

* cited by examiner

Primary Examiner — Edwyn Labaze
(74) Attorney, Agent, or Firm — The Webb Law Firm

(57) ABSTRACT

Provided is a combi-card, i.e. a combination type IC card, which can be used in either contact and non-contact manner, and a communication system using the same, and the combi-card is provided with a transponder chip module formed with a RF antenna and attached in a recess region of a card body and is characterized by the use of the RF antenna of the transponder chip alone as a transmitting and receiving antenna.

7 Claims, 7 Drawing Sheets

laminating (c)

COMBI CARD AND COMMUNICATION SYSTEM USING THEREOF

CROSS-REFERENCE(S) TO RELATED APPLICATIONS

The present invention claims priority of Korean Patent Application No. 10-2009-0055060, filed on Jun. 19, 2009, which is incorporated herein by reference.

BACKGROUND OF THE INVENTION

1. Field of the Invention

The present invention relates to a combi-card (or a dual-interface card), i.e. a combination type IC card, which can be used in either contact and non-contact manner, and a communication system using the same, and more particularly, to a combi-card which uses no electrical connection process such as conductive glue, wire bonding and soldering, is producible with a simple process, has a very low fraction defective on production and also has a very high durability, and a communication system using the same which can expand a communication range of the combi-card and prevent communication error.

2. Description of Related Art

A combi-card tends to be widely used in various fields of communication, finance, traffic, electronic business and so on. Such card which supports both contact type and non-contact type includes a combi-card and a hybrid card.

These two cards are common in that they contact type and non-contact type interfaces, but they differ in structure.

The hybrid card is the card in which physically separate contact type card and non-contact type card are present within a single card, and it can supports both contact type and non-contact type but should be equipped with separate hardware and software resources for contact type and non-contact type.

On the contrary, the combi-card is the card of the type that the contact type card and non-contact type card share commonly usable portions, and it is now mainly used in the electronic money market since it can affect incorporation of different kinds of applications through the share of internal resources.

Figure 1:
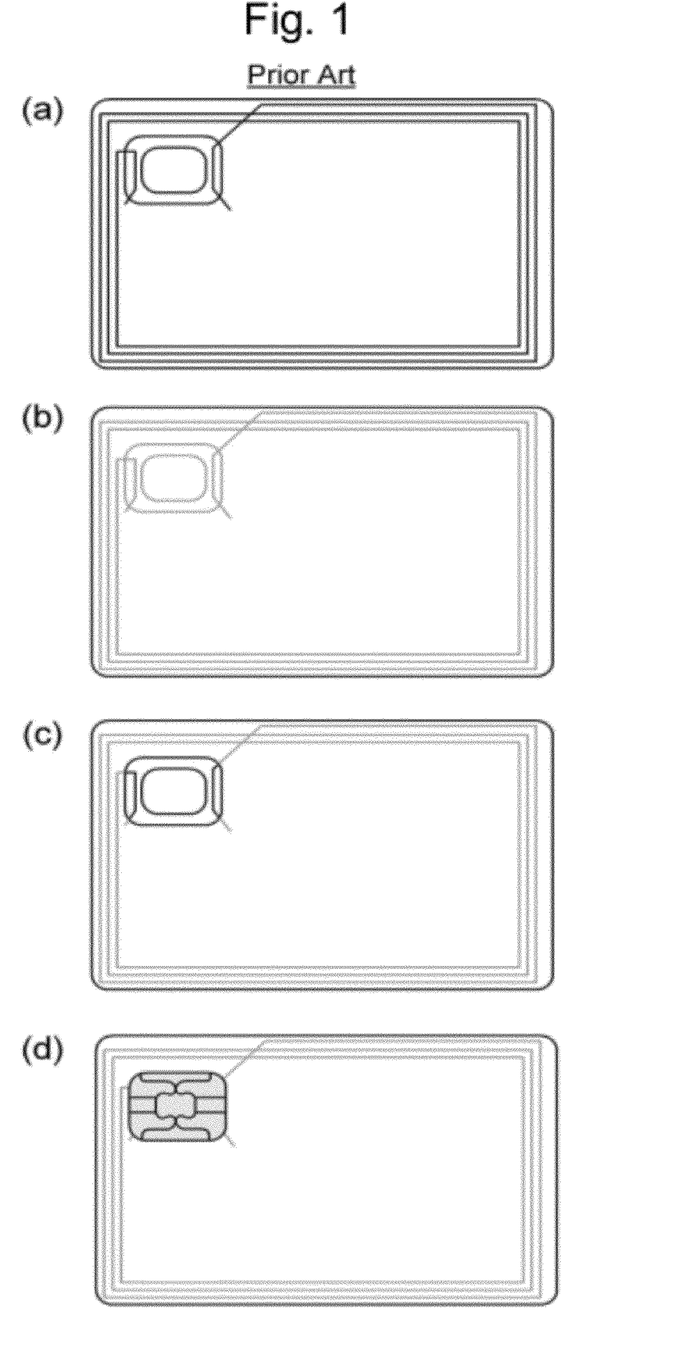
FIG. 1 illustrates an example of a method of fabricating a conventional combi-card.

FIG. 1 is one example showing a method of fabricating a conventional combi-card; an antenna insertion sheet is formed with an antenna coil and a connection terminal for the antenna coil is formed in the region where an IC chip module (a Chip On Board (COB) provided with an IC chip and an IC terminal) is located. After that, a plurality of sheets including a lower print sheet, the antenna coil insertion sheet, an upper print sheet and an upper protection sheet is stacked and subject to heat and pressure to form a single thin film, and the thin film is then milled until the connection terminal of the antenna coil is exposed, to form a recess region, and the exposed connection terminal of the antenna coil is applied with a conductive glue and then electrically connected with the IC chip module, thereby fabricating the combi-card.

In the conventional combi-card shown in FIG. 1, electrical connection between the IC chip module and the antenna coil and physical attachment of the IC chip module are accomplished by the conductive glue, and there is a problem that dry condition, conductivity and adhesiveness according to the use of the conductive glue can not meet the requirements necessary for the use of the card.

Since although a conventional conductive glue meets a curing condition to make firm adhesion only when heat of about 150° C. and a predetermined pressure are applied for about 30 minutes, heat of 150 to 200° C. and a predetermined pressure are applied for 1 to 2 seconds in consideration of a thermal deformation of a card upon the fabrication of the card and this adhering condition can not meet the curing condition of the glue, the glue is naturally shrunken to generate crack on the adhesive face while the glue is cured after the IC chip module is attached, and the adhesive strength is reduced by the generated crack, thereby causing a problem in connection between the terminal of the IC chip module and a contact of the antenna coil.

In a method of fabricating a combi-card to overcome the aforementioned problem, "method of forming a dual-interface IC card and a card formed of such a method" (Korean Patent Application Publication No. 10-2002-0062198), in which a contact of an antenna coil and a terminal of a IC chip module are directly soldered the without use of conductive glue as shown in FIG. 1, has been developed, but it has a problem in mass production since increased fabrication time is taken as the soldering should be implemented manually and a fraction defective may be increased depending on worker's skill.

Figure 2:
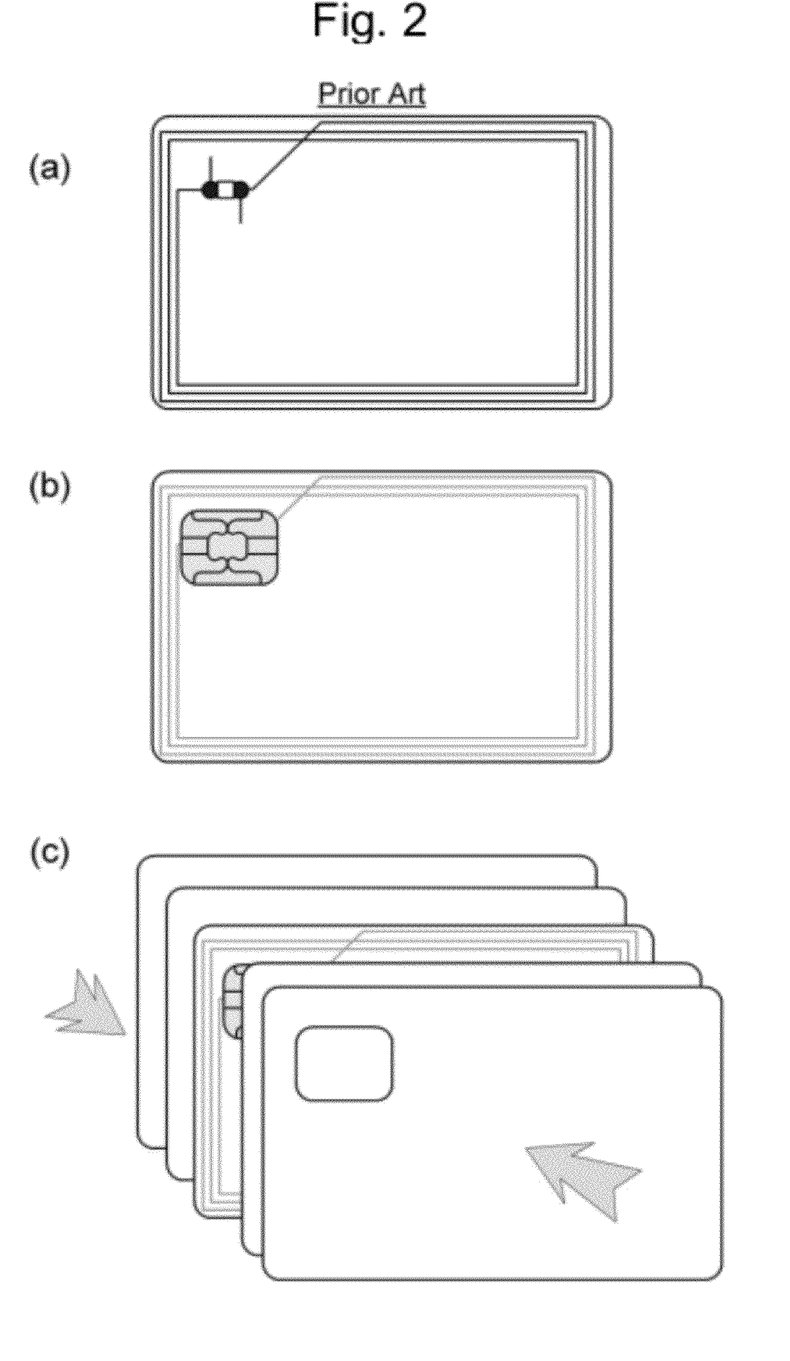
FIG. 2 illustrates another example of a method of fabricating a conventional combi-card.

"method for manufacturing IC card through a foil stacking" (Korean Patent Application Publication No. 10-2004-0049981" and "chip card and method for the production of a chip card" (Korean Patent Application Publication No. 10-2008-0098360", in which an antenna coil formed in an antenna coil insertion sheet of a card and an IC chip module are directly bonded to form a combi-card inlay layer and a print layer and a protection layer are successively stacked and assembled thereon and the resulting assembly is then subject to thermal lamination, thereby processing a combi-card as shown in FIG. 2, are also used, and these methods can keep durability of connection part but have a high fraction defective in production process, thereby causing many problems in mass production.

Figure 3:
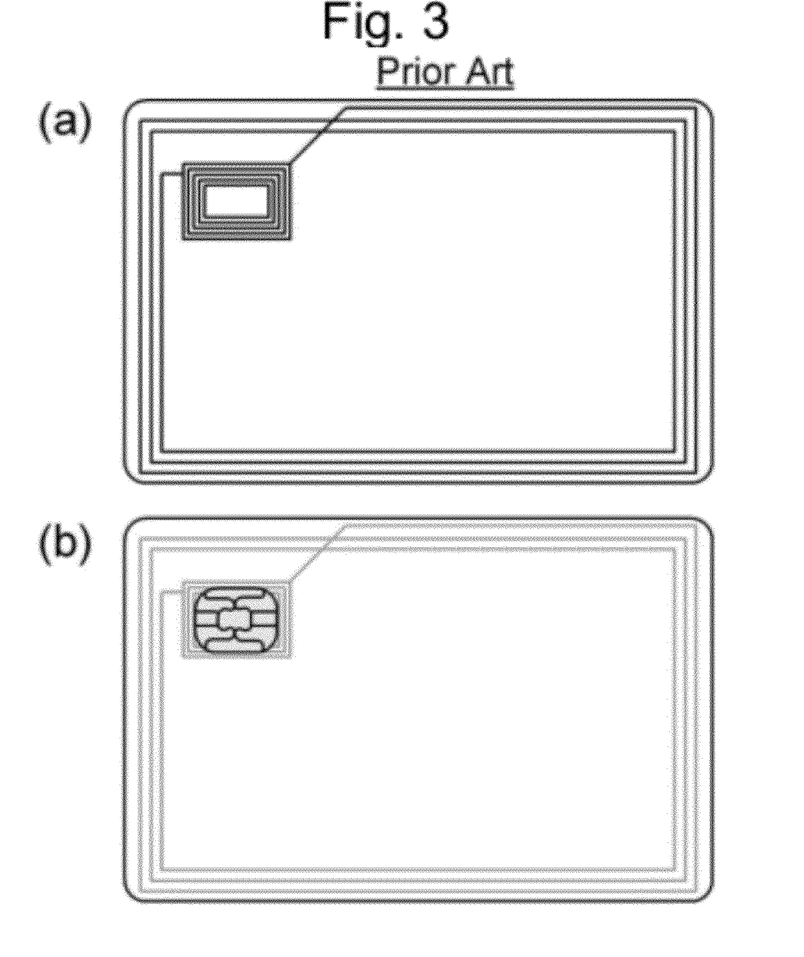
FIG. 3 illustrates further another example of a method of fabricating a conventional combi-card.

In another method, "IC module and smart card" (U.S. Pat. No. 6,378,744), "booster antenna for IC card" (Japanese Patent Application Publication No. 2003-218624) and "IC module for IC card and IC card using the same" (Korean Patent No. 10-0381780) which are a booster type combi-card with built-in primary coil antenna having no electrical connection with an IC chip module and a secondary antenna for amplification as shown in FIG. 3, are used, but they are known to be not widely used since there are difficulties in design change of the secondary antenna and fabrication of the antenna and a technical problem in mount of the amplifying antenna onto a card in the fabrication process due to the characteristic of the amplifying antenna, and communication error occurs frequently due to power dissipation and interference during communication through the primary coil antenna, the amplifying secondary antenna and an antenna of a reader.

SUMMARY OF THE INVENTION

Embodiments of the present invention are directed to providing a combi-card which uses no conductive glue, soldering, thermo compression boding, wire bonding and the like, formed with no junction between terminals, can effectively protect information in the combi-card, can be produced by very simple method and thus produced massively within a short time with high productivity, has high durability and can prevent generation of a progressive defect, and a communication system using a combi-card which expands a communication range between the combi-card and a card reader, has high security and carries out smooth transaction with the card reader.

In one embodiment, a combi-card is provided with a transponder chip module formed with a RF antenna and attached in a recess region of a card body, wherein the combi-card is characterized in that it is provided with the RF antenna of the transponder chip alone as a transmitting and receiving antenna.

In another embodiment, a communication system using a combi-card includes a combi-card which is provided with a transponder chip module formed with a RF antenna and is attached in a recess region of a card body and is provided with the RF antenna of the transponder chip alone as a transmitting and receiving antenna; a card reader for reading out data from the combi-card; and a coupling device formed with an antenna coil for an electromagnetic coupling with the transponder chip and the card reader. Preferably, the coupling device is attached to or placed on an outer surface of the card reader, is spaced a predetermined distance apart from the card reader, or placed in contact with the combi-card.

Preferably, the antenna coil of the coupling device includes a first antenna coil coupled with the RF antenna and a second antenna coil connected to an end of the first antenna coil and coupled with a reader antenna provided in the card reader.

Preferably, the antenna coil is made of Cu, Ag, Al or a mixture thereof, and the coupling device has the antenna coil placed between two sheets independently selected from the group consisting of a polyvinylchloride (PVC) sheet, a polycarbonate (PC) sheet a polyethylene terephthalate (PET) sheet, a glycol modified polyethylene terephthalate (PETG) sheet, a sheet made of a mixture of PVC, acrylonitrile butadiene styrene (ABS), PC and PETG resins, and a polyester-based synthetic paper (sheet), and is made by stacking the two sheets together with the antenna coil and unifying them by thermal lamination.

Preferably, the coupling device further includes an adhesive layer and is attached to outer surface of a housing of the card reader by the adhesive layer.

The combi-card in accordance with the present invention has an advantage that a problem of a progressive defect is not generated as conductive glue, soldering, thermo compression boding, wire bonding and the like used in a conventional combi-card are not used and junction between terminals is not formed. Also, the combi-card in accordance with the present invention has advantages that it can can be produced by very simple method and thus produced massively within a short time with high productivity, and it is low in production cost, and has high durability. Further, it is possible to protect information in the combi-card without separate shielding device for preventing tapping or skimming of wireless information.

Furthermore, the combi-card in accordance with the present invention has advantages that non-contact transaction of the combi-card is enhanced, a communication range is expanded and information of the combi-card can be effectively protected.

DETAILED DESCRIPTION OF MAIN ELEMENTS

100: card body 110: recess region
200: transponder chip module 1000: combi-card
300: coupling device 400: card reader
220: RF antenna 320: antenna coil

DESCRIPTION OF SPECIFIC EMBODIMENTS

The advantages, features and aspects of the invention will become apparent from the following description of the embodiments with reference to the accompanying drawings, which is set forth hereinafter.

Hereinafter, preferred embodiments of the present invention will be described in detail with reference to accompanying drawings. The drawings illustrated below are provided as an example to fully convey the thought of the invention to those skilled in the art. Accordingly, the present invention is not limited to the drawings illustrated below, and may be realized by other alternative arrangements. Further, the same reference numerals represent the same structural elements throughout the specification.

Unless defined otherwise, all technical and scientific terms used herein have the same meanings as commonly understood by one of ordinary skill in the art to which the present invention belongs, and, in other instances, well known functions and structures have not been described in detail in order not to unnecessarily obscure the present invention.

Figure 4:
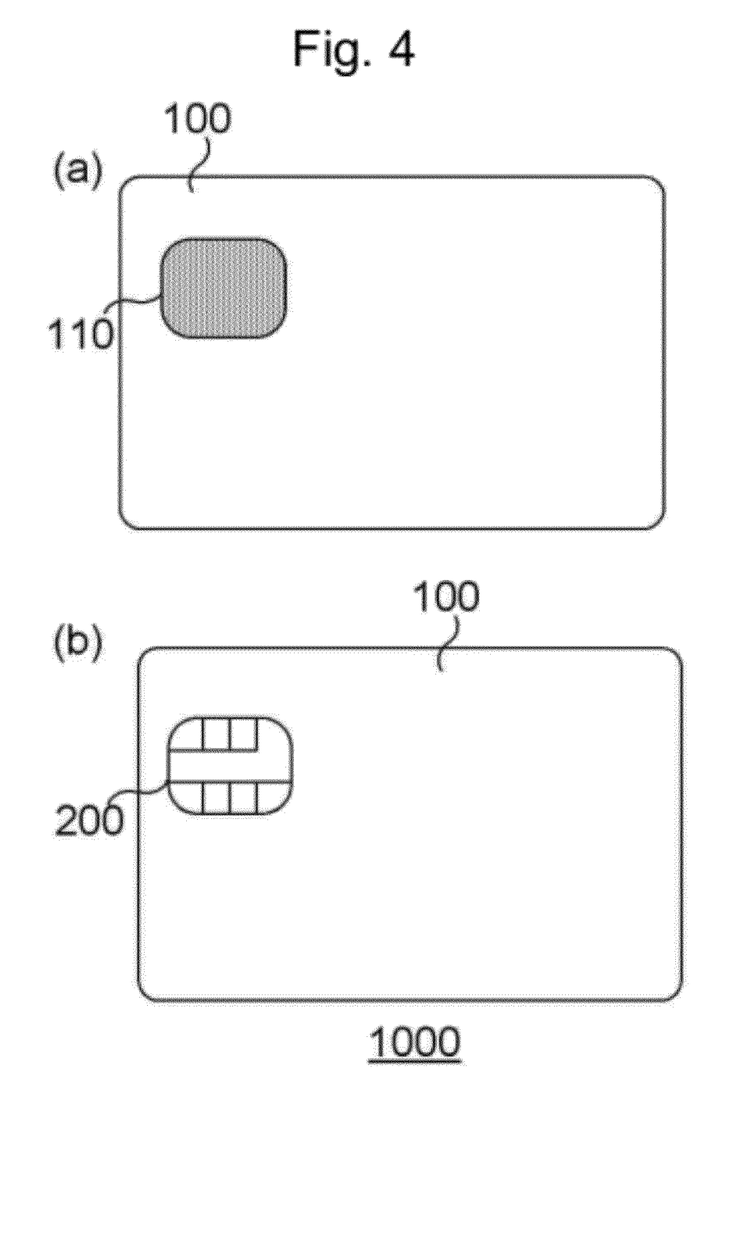
FIG. 4 illustrates an example of a method of fabricating a combi-card in accordance with the present invention.

As illustrated in FIG. 4, a combi-card 1000 in accordance with the present invention is the card which is provided with a transponder chip module 200 formed with a RF antenna and attached in a recess region 110 of a card body 100 and, the combi-card 1000 is characterized in that it is provided with the RF antenna of the transponder chip 200 alone as a transmitting and receiving antenna.

Figure 5:
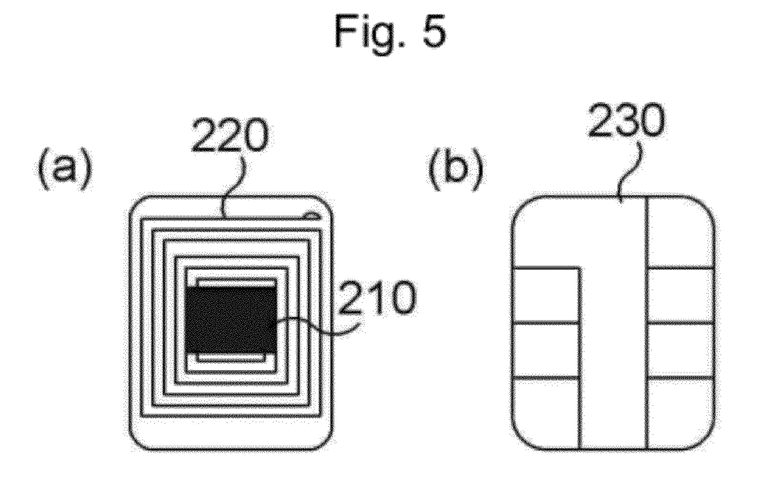
FIG. 5 illustrates an example of a transponder chip module of a combi-card in accordance with the present invention.

The transponder chip module 200 is provided with an IC chip 210, and the IC chip module 210 is provided with at least built-in microprocessor unit, Card Operating System (COS), and memory device (EEPROM) to thereby have characteristics of storage, processing and security and transacts various information used in the fields of electronic business, traffic, finance and security. As illustrated in FIG. 5, the transponder chip module 200 includes an IC chip module provided with an electrical contact pin 230 for providing of contact service and the IC chip 210 and a RF antenna 220 for providing of non-contact service which are provided in the IC chip module.

The RF antenna 220 provided in the transponder chip is formed in the form of circular or rectangular non-contact antenna having a size of a standard module specification (e.g. 13.0 mm×11.8 mm) or smaller during the fabrication of a chip module substrate.

The RF antenna 200 is electrically connected with the IC chip 210 to carry out functions of efficiently radiating electric waves or efficiently inducing an electromotive force by electric waves. The RF antenna 220 is mounted in the form of the transponder chip module 200 to form the combi-card, and the RF antenna 220 mounted in the combi-card 1000 is preferably the antenna that resonates with a communication frequency between the combi-card and a card reader 400 for read-out of data. The communication frequency preferably meets the international standard, and is for example a communication frequency according to ISO 14443, the international standard for card wireless communication.

The RF antenna 220 provided in the transponder chip module 200 may be a RF antenna for communication in 12 to 18 MHz frequency band, preferably a RF antenna for 13.56 MHz communication.

The card body 100 is formed by stacking a plurality of transparent or opaque synthetic resin sheets and unifying them by thermal lamination.

The transparent or opaque synthetic resin sheets may employ a polyvinylchloride (PVC) sheet, a polycarbonate (PC) sheet a polyethylene terephthalate (PET) sheet, a glycol modified polyethylene terephthalate (PETG) sheet, a sheet made of a mixture of PVC, acrylonitrile butadiene styrene (ABS), PC and PETG resins, or a polyester-based synthetic paper. The polyester-based synthetic paper is made by fabricating a plastic sheet into a form of paper and giving opaqueness, writability and printability thereto by a special processing.

The card body 100 is formed with a recess region 110, which has a shape corresponding to that of the transponder chip module 200, by milling.

The transponder chip module 200 is fixedly attached in the recess region 110 formed in the card body 100 by heat or photo curing adhesive.

The combi-card 1000 in accordance with the present invention as described above is that the transponder chip module 200 formed with the RF antenna 220 is physically attached in the recess region of the electrically non-conductive card body 100, and is characterized in that the RF antenna 200 formed in the transponder chip module 200 alone is present as an antenna for wireless communication in the combi-card 1000.

The combi-card of the present invention is formed only with the RF antenna of the transponder chip module, is not provided with separate antenna coil or loop antenna within the card, is not provided with separate antenna for amplification within the card, and has no junction structure where the antenna coil and IC chip or COB formed within the card are electrically connected.

The combi-card of the present invention, accordingly, requires no conductive glue, wire bonding and soldering used in electrical connection process, can be produced by very simple method of attaching the transponder chip module in the recess region using a non-conductive adhesive with high adhesive strength, can be produced massively within a short time with high productivity, is low in production cost, keeps high durability against various deformation such as impact, bending, twist and the like, and has no occurrence of a progressive defect.

Also, the combi-card of the present invention, since it is provided with the RF antenna of the transponder chip alone, not only ensures speed and convenience that are advantages of a non-contact type interface, but also can protect information in the combi-card without separate shielding device for preventing tapping or skimming of wireless information when it is used as an e-ID combi-card such as an identification card which requires security.

Figure 6:
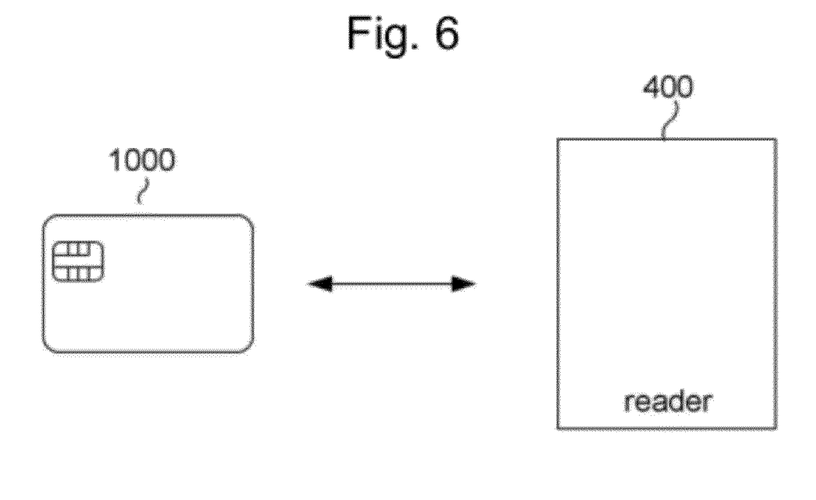
FIG. 6 illustrates an example of a structure of a communication system using a combi-card in accordance with the present invention.

FIG. 6 illustrates an example of a communication system using a combi-card in accordance with the present invention, and as illustrated in FIG. 6, a communication system using a combi-card 1000 in accordance with the present invention includes the combi-card in accordance with the present invention as described above and a card reader 400 which communicates with the combi-card 1000 to read out information from the combi-card 1000.

The card reader 400 is the card reader that reads out/decodes data from the combi-card using a wireless frequency signal, and is a conventional card reader (that supports either contact type and non-contact type) including a RF transmitting and receiving module, a control module, a memory, a microprocessor and a power supply.

The card reader 400 communicates with the combi-card 1000 in contact and non-contact manners, and the contact type communication means that the card reader 400 and the combi-card 1000 are physically and electrically connected to carry out the communication and the non-contact type communication means that the card reader 400 and the combi-card 1000 communicate with each other using an electromagnetic wave of a predetermined frequency with being physically separated from each other.

The card reader 400 is the card reader for 12 to 18 MHz frequency band, specifically the card reader for 13.56 MHz communication, and the inside of the card reader 400 is provided with a reader antenna for non-contact communication with the combi-card 1000.

Figure 7:
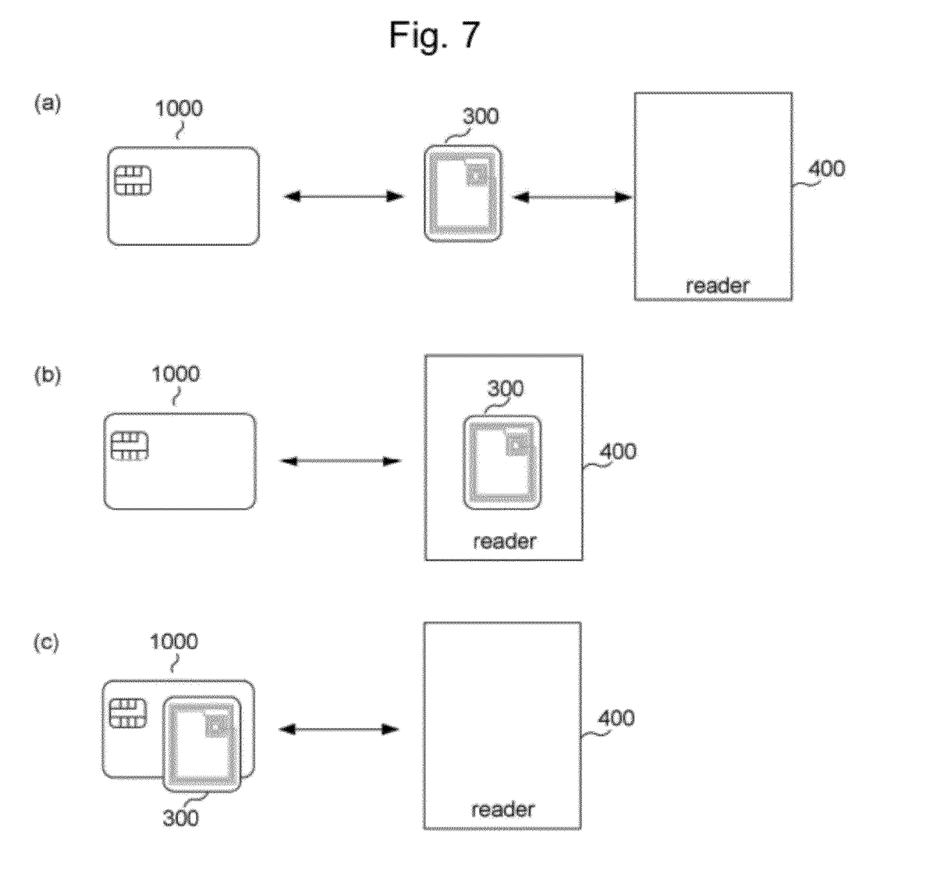
FIG. 7 illustrates another example of a structure of a communication system using a combi-card in accordance with the present invention.

FIG. 7 illustrates a preferred example of a communication system using a combi-card in accordance with the present invention, and as illustrated in FIG. 7, a communication system using a combi-card in accordance with the present invention includes the combi-card 1000 in accordance with the present invention as described above, a card reader 400 which communicates with the combi-card 1000 using a predetermined frequency to read out data from the combi-card 400, and a coupling device 300 formed with an antenna coil for amplifying the communication frequency between the combi-card 1000 and the card reader 400. Of course, the card reader 400 supports the contact type communication.

The coupling device 300 has preferably a shape of a thin plate with a thickness of 1 to 10 mm and more preferably a shape of a card. The coupling device 300 may be placed at a position spaced a predetermined distance apart from the card reader 400 as illustrated in FIG. 7(a), or may be attached to or placed on an outer case of the card reader 400 as illustrated in FIG. 7(b). Alternatively, as illustrated in FIG. 7(c), the coupling device 300 may be used in contact with or in the vicinity of the combi-card 1000 with not being integrated with the combi-card 1000.

When the coupling device 300 and the card reader 400 are placed a predetermined distance from each other, the distance between the coupling device 300 and the card reader 400 is preferably 1 to 4 cm.

Figure 8:
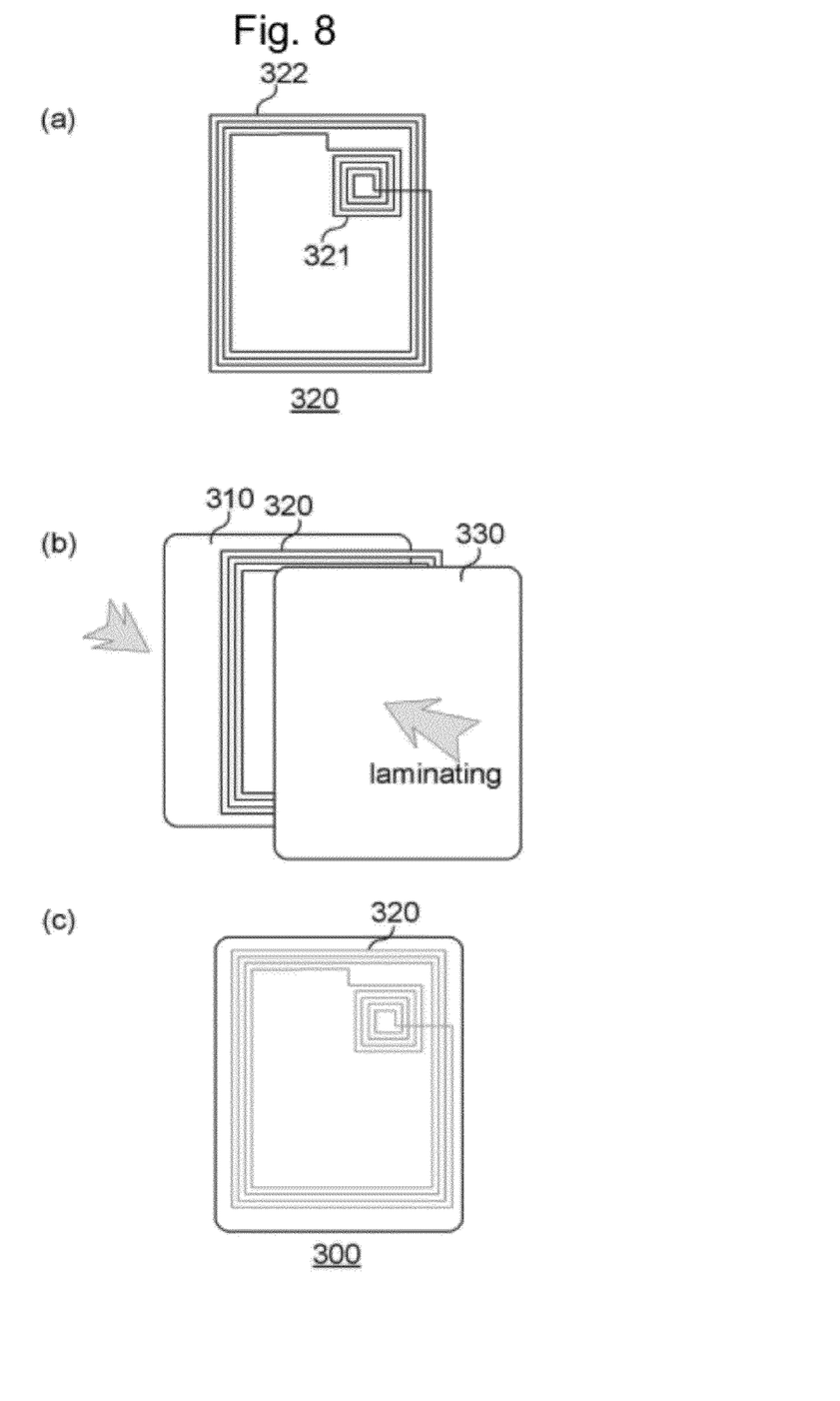
FIG. 8 illustrates an example of a coupling device of a communication system using a combi-card in accordance with the present invention.

As illustrated in FIG. 8, the coupling device 300 has the antenna coil 320 placed between two sheets 310, 330 independently selected from the group consisting of a polyvinylchloride (PVC) sheet, a polycarbonate (PC) sheet a polyethylene terephthalate (PET) sheet, a glycol modified polyethylene terephthalate (PETG) sheet, a sheet made of a mixture of PVC, acrylonitrile butadiene styrene (ABS), PC and PETG resins, and a polyester-based synthetic paper (sheet).

The coupling device 300 is made by stacking the two sheets 310, 330 together with the antenna coil and unifying them by thermal lamination. At this time, the antenna coil 320 provided between the sheets 310, 330 may include a case that a coated coil is embedded on one face of the sheet, a case that conductive ink is printed on one face of the sheet to form a predetermined patter (antenna coil), and a case that a metal layer is formed on one face of the sheet and the metal layer is partially etched to form a predetermined patter (antenna coil).

The antenna coil 320 of the coupling device 300 carries booster function to expand a communication range of the combi-card 1000 and prevent communication error.

Specifically, the coupling device 300 amplifies carrier of a RF band matched with communication standard according to the use of a card. In one example, the antenna coil 320 of the coupling device 300 can amplify a carrier of 12 to 18 MHz frequency band, specifically can amplify a 13.56 MHz carrier which comply with ISO 14443.

The antenna coil 320 of the coupling device 300 is a rectangular or circular coil with a size of 85.6 mm×54 mm or smaller, and the antenna coil may be formed by embedding of a coil, printing conductive ink in a predetermined pattern, or etching a metal layer into a predetermined pattern.

As illustrated in FIG. 8(a), the antenna coil 320 of the coupling device 300 preferably includes a first antenna coil 321 and a second antenna coil 322, and one end of the first antenna coil 321 and one end of the second antenna coil 232 are preferably connected with each other. The first antenna coil 321 is electromagnetically coupled corresponding to the RF antenna 220 provided in the transponder chip module 200 of the combi-card 1000, and the second antenna coil 322 is electromagnetically coupled corresponding to the reader antenna provided in the card reader 400.

This is because the reader antenna and the RF antenna 220 have different sizes, and the first antenna coil 321 and the second antenna coil 322 are the antennas for generating induced current by efficient coupling with the reader antenna provided in the card reader 400 and the RF antenna 220 provided in the combi-card 1000.

Specifically, the first antenna coil 321 is the antenna for generating induced current by efficient coupling with the RF antenna 220 provided in the combi-card 400 and the second antenna coil 322 is the antenna for generating induced current by efficient coupling with the reader antenna provided in the card reader 322.

The first antenna coil 321 may be a rectangular or circular coil with a size of 14 mm×13 mm or smaller, and the second antenna coil 322 may be a rectangular or circular coil with a size of 85.6 mm×54 mm or smaller.

Also, the antenna coil 320 of the coupling device 300 may include a pattern that can function as a condenser.

The antenna coil 320 may be made of a metal material with excellent electric conductivity, and for example, the antenna coil 320 is made of Cu, Ag, Al or a mixture thereof. The coupling device 300 is placed outside a housing of the card reader 400, and specifically the coupling device 300 may be attached to an outer surface of the housing of the card reader 400, fixedly placed in a predetermined position of the card reader, or spaced a predetermined distance from the card reader, or the coupling device 300 may be used together with the combi-card 1000.

It is preferred that the coupling device 300 further includes an adhesive layer on top or bottom thereof and is attached to outer surface of the card reader 400 by the adhesive layer.

The communication system in accordance with the present invention is characterized in that it employs a transponder chip including an IC chop module and a RF antenna to protect internal information of the card and ensure reliability and durability of a card, and is not provided with an antenna coil for amplification of electromagnetic induction in an inside of the combi-card except for a transponder chip, and is also characterized in that as a separate auxiliary antenna capable of functioning as a booster, it can ensure security of a combi-card and at the same time expand a communication range and carry out smooth non-contact transaction.

Similar to FIG. 4, a card body was fabricated by stacking a plurality of sheets such as a plastic print sheet, a protection layer sheet and so on, which are used in a conventional card fabrication, without embedding the amplification antenna in a card body and then thermally laminating the stacked sheets (180-186° C., 180-187 bar).

A position of the fabricated card body where the transponder chip module (SPS co., JK10) is to be inserted was milled with a Computer Numerical Control (CNC) machine to form the recess region of a module shape so that a surface of the card and a surface of the transponder chip module are placed on the same plane when the transponder chip module is attached in the recess region. After that, the transponder chip module adhered with a hot-melt adhesive (TESA, 8410) was inserted in the recess region and then mounted on the surface of the card by applying heat and pressure (190-210° C., 3-8 bar), thereby fabricating a combi-card.

The fabricated combi-card was tested for non-contact transaction between the combi-card and the reader through a commercially available reader (SCM microsystem, SDi010), and it could be confirmed from the result that the non-contact transaction is carried out and the non-contact transaction is carried out only in a certain portion of the reader.

After stacking a PET sheet formed with an antenna coil similar to FIG. 8 between two PC sheets, thermal lamination (180-186° C., 180-187 bar) was carried out to thereby fabricate the coupling device.

After that, the fabricated coupling device was fixed or attached to the surface of the outer case of commercially available reader (SCM microsystem, SDi010) and non-contact transaction was then tested, and it could be confirmed form the result that the transaction can be carried out within a communication range of 1 cm without the coupling device and the transaction can be carried out within a communication range of 4 cm with attachment (fixing) of the coupling device.

The combi-card and communication system using the same in accordance with the present invention can solve the problem accordion to connection between the antenna and chip terminal that causes defect during a process, remove difficult in the fabrication process and economic cost due to insertion of the antenna, and ensure durability of the combi-card. Also, in accordance with the present invention, it is possible to obtain economic profit in the fabrication process and increase security of a combi-card due to removal of built-in antenna, and it is also possible to place or attach an auxiliary antenna to a conventional reader or use it together with a combi-card. Also, in accordance with the present invention, it is possible to solve the progressive defect of a combi-card, and widen the use of the combi-card.

While the present invention has been described with respect to the specific embodiments, it will be apparent to those skilled in the art that various changes and modifications may be made without departing from the spirit and scope of the invention as defined in the following claims.

What is claimed is:

1. A combi-card, which is provided with a transponder chip and attached in a recess region of a card body, the transponder chip including an integrated circuit (IC) chip and a radio frequency (RF) antenna electrically connected to the IC chip, wherein:

the RF antenna resonates with a communication frequency between the combi-card and a card reader for read-out of data and has a size of a standard module specification or smaller; and the combi-card is characterized in that it is provided with a single antenna that is the RF antenna of the transponder chip as an antenna.

2. A communication system using a combi-card, comprising:
a combi-card which is provided with a transponder chip and attached in a recess region of a card body, the transponder chip including an integrated circuit (IC) chip and a radio frequency (RF) antenna electrically connected to the IC chip, wherein the RF antenna resonates with a communication frequency between the combi-card and a card reader for read-out of data and has a size of a standard module specification or smaller, and wherein the combi-card is characterized in that it is provided with a single antenna that is the RF antenna of the transponder chip as an antenna;
a card reader for reading out data from the combi-card; and
a coupling device formed with an antenna coil for an electromagnetic coupling with the transponder chip and the card reader.

3. The communication system using a combi-card of claim 2, wherein the coupling device is attached to or placed on an outer surface of the card reader, is spaced a predetermined distance apart from the card reader, or is placed in contact with the combi-card.

4. The communication system using a combi-card of claim 2, wherein the antenna coil of the coupling device includes a first antenna coil coupled with the RF antenna and a second antenna coil connected to an end of the first antenna coil and coupled with a reader antenna provided in the card reader.

5. The communication system using a combi-card of claim 2, wherein the antenna coil is made of Cu, Ag, Al or a mixture thereof.

6. The communication system using a combi-card of claim 2, wherein the coupling device has the antenna coil placed between two sheets independently selected from the group consisting of a polyvinylchloride (PVC) sheet, a polycarbonate (PC) sheet, a polyethylene terephthalate (PET) sheet, a glycol modified polyethylene terephthalate (PETG) sheet, a sheet made of a mixture of PVC, acrylonitrile butadiene styrene (ABS), PC and PETG resins, and a polyester-based synthetic paper (sheet), and is made by stacking the two sheets together with the antenna coil and unifying them by thermal lamination.

7. The communication system using a combi-card of claim 2, wherein the coupling device further includes an adhesive layer and is attached to an outer surface of a housing of the card reader by the adhesive layer.

* * * * *